United States Patent
Choong et al.

(10) Patent No.: US 8,527,105 B1
(45) Date of Patent: Sep. 3, 2013

(54) ENERGY MONITORING

(75) Inventors: Jason Yew Choo Choong, Mountain View, CA (US); Peter Graeme Cobb, Victoria (AU)

(73) Assignee: Daintree Networks, Pty. Ltd., Scoresby (AU)

( * ) Notice: Subject to any disclaimer, the term of this patent is extended or adjusted under 35 U.S.C. 154(b) by 291 days.

(21) Appl. No.: 13/175,297

(22) Filed: Jul. 1, 2011

(51) Int. Cl.
*G05D 11/00* (2006.01)

(52) U.S. Cl.
USPC ............... 700/291; 702/61; 315/294

(58) Field of Classification Search
USPC ............ 700/291; 702/61; 315/294
See application file for complete search history.

(56) References Cited

U.S. PATENT DOCUMENTS

| | | | | |
|---|---|---|---|---|
| 2002/0176342 A1* | 11/2002 | Worthington et al. | ..... | 369/53.31 |
| 2007/0038394 A1* | 2/2007 | Gagnon et al. | ............... | 702/61 |
| 2008/0062839 A1* | 3/2008 | Worthington et al. | ..... | 369/53.31 |
| 2010/0295474 A1* | 11/2010 | Chemel et al. | ............... | 315/294 |
| 2010/0295482 A1* | 11/2010 | Chemel et al. | ............... | 315/312 |
| 2010/0296285 A1* | 11/2010 | Chemel et al. | ............... | 362/235 |
| 2010/0301770 A1* | 12/2010 | Chemel et al. | ............... | 315/294 |
| 2010/0301834 A1* | 12/2010 | Chemel et al. | ............... | 324/105 |
| 2010/0302779 A1* | 12/2010 | Chemel et al. | ......... | 362/249.02 |
| 2011/0001436 A1* | 1/2011 | Chemel et al. | ............... | 315/291 |
| 2011/0001438 A1* | 1/2011 | Chemel et al. | ............... | 315/297 |
| 2011/0251807 A1* | 10/2011 | Rada et al. | ..................... | 702/61 |
| 2012/0290230 A1* | 11/2012 | Berges Gonzalez et al. | ... | 702/61 |

OTHER PUBLICATIONS

Class 1000 Single Phase kWh meter—E-Mon D-Mon Submeters 'E-Mon Energy Monitoring Products'. [online] copyright 2010. [Retrieved on Sep. 11, 2012]. Retrieved from Internet electronic mail: http://www.emon.com/products_class1000.html, 2 pages.

DENT Instruments 'PowerscoutTM Series'. [online] [Retrieved on Sep. 11, 2012]. Retrieved from Internet electronic mail: http://www.dentinstruments.com/media/PowerScout_Update/Photos/PowerScout_Brochure.pdf, 6 pages.

* cited by examiner

*Primary Examiner* — Mohammad Ali
*Assistant Examiner* — Anthony Whittington
(74) *Attorney, Agent, or Firm* — Fish & Richardson P.C.

(57) ABSTRACT

Methods, software and systems for determining and monitoring the energy consumption of electrical load devices (e.g., variable load devices and non-variable load devices) in an environment (e.g., an office building or a house).

20 Claims, 5 Drawing Sheets

ENERGY MONITORING

BACKGROUND

This specification relates to monitoring the energy consumption of electrical loads.

Control systems are commonly used to manage and control electrical loads (e.g., lighting systems, HVAC equipment, etc.) in commercial and residential environments (e.g., an office building, a home residence). Such control systems can be used to conserve energy in the commercial or residential environments, which can reduce energy costs and promote energy efficiency. For example, a facility manager can utilize a control system to automatically turn off office lights after the occupants have left the building for the day or to adjust the set points of the facility's heating and cooling system to reduce demand on and energy consumption by the heating and cooling system during weekends when the building is not occupied (e.g., lower the heating set point during winter months and raise the cooling set point during summer months).

In addition to managing the operation of the electrical loads, it is also desirable to determine how much energy is being consumed by the various electrical loads. Energy monitoring systems are one tool that can be utilized to monitor energy consumption. Energy monitoring systems can cooperate with control systems to further enhance energy conservation by providing feedback to the control system or facility manager indicating the energy consumed by the various electrical loads. This feedback can be used to adjust the management of the electrical loads or to make informed decisions about energy use. For example, if the energy monitoring system indicates that a particular light assembly is consuming energy to light a space during nighttime hours when persons are not usually present, the light assembly may be dimmed to reduce its energy consumption. The dimmed level may be such that the space is still sufficiently lit so that people may walk through the space safely.

The monitoring of energy consumption can also be useful for partnering with energy providers (e.g., utilities and utility commissions) that are pursuing public and technology policies that will allow the providers to "smooth" energy consumption over peak usage periods. By efficiently managing energy usage, the energy providers can avoid the need to build new power stations and distribution infrastructure, resulting in significant cost savings and energy conservation. These cost savings can be passed on to the energy consumers that partner with the providers.

Current energy consumption monitoring systems balance trade-offs are cost, accuracy and granularity. For example, energy consumption can be inferred based on the known states of the loads (e.g., on, off and dimming level) and the data from the load manufacturer detailing the operational parameters of the load (e.g., power requirements). Employing this type of inferential monitoring can provide, at a relatively low cost, highly granular results as each device or circuit containing a device or devices can be monitored. However, because this technique relies on inferential calculations to determine the energy consumed by the load, as contrasted with measuring the energy consumed, some inaccuracies may result.

Another monitoring practice is to place a power meter on a circuit. A circuit may be of any size, and may have dozens, if not hundreds, of power consuming devices. This approach has a low-to-moderate cost (e.g., the cost is for the power meter, and is proportional to how many power meters are used, or the ratio of power meters to power consumption devices), and can also be very accurate (e.g., commercial-grade power meters often target 0.2% accuracy to comply with ANSI C 12.20 and IEC687 requirements. However, this approach has a very low granularity.

Yet another approach is to measure power directly for each power consumption device. An emerging practice is to place low-cost power meters within every device, or in some cases, on very small circuits (e.g., two to three power consuming devices). A power consuming device might be a light fixture for highly granular information. While this approach is highly granular and accurate, the cost is very high compared to the other approaches (e.g., each power meter may cost several dollars or more).

Another trade-off that may need to be considered is coverage of a power monitoring circuit. For example, a building electrical grid may be such that a power meter monitoring a circuit may pick up loads used by other tenants in a multi-tenant facility and/or loads not under control of the control system, e.g., such as power to cubicles (task lights, computers, and the like) or security systems, etc. This issue is more common when placing power meters on circuits, since there may not be sufficient granularity. Conversely, power meters may not pick up some of the loads under control. This is more common in the first and third approaches, but is less common for the second approach, because the second approach monitors entire circuits and hence will pick up all loads.

SUMMARY

In general, one innovative aspect of the subject matter described in this specification can be embodied in methods that include the actions of, for each of a plurality of load devices, receiving energy consumption values of the load device, an energy consumption value is a measure of the energy consumed by the load device during a given time period; where the plurality of load devices comprise: variable load devices, each of the variable load devices having selectable load states and energy consumption values ranging from an OFF energy consumption value to a maximum energy consumption value, the energy consumption values are proportional to the selected load state of the variable load device; and non-variable load devices, each of the non-variable load devices having a single load state and energy consumption values ranging from a first energy consumption value to a maximum energy consumption value, the energy consumption values correspond to the single load state of the non-variable load device. The actions further include, for each of the variable load devices, correlating each of the energy consumption values with the load state causing that energy consumption value based on which energy consumption values were received during selected load states; and generating an energy consumption profile specifying energy consumption values of the variable load device at different load states based on the correlation; for each of non-variable load devices: receiving energy consumption values corresponding to the single load state; and generating an energy consumption profile specifying energy consumption values of the non-variable load device; and generating environment energy consumption data for a given time period based on the load states and energy consumption profiles of the plurality of load devices. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. Energy monitoring can be performed with a high degree of granularity (e.g., energy consumption measured down to the individual load or circuit carrying the load), and at a low cost (e.g., as compared with placing power meters on every load) and with accurate results (e.g., as compared to an inferential approach). In particular, combination of software based energy calculations and readings from appropriately placed power meters allow for highly granular results. However, the combination of calculations and readings also allows for fewer power meters than would be required without the calculations to achieve the same level of granularity, thus reducing overall system and installation costs.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION 1.0 System Overview

Figure 1:
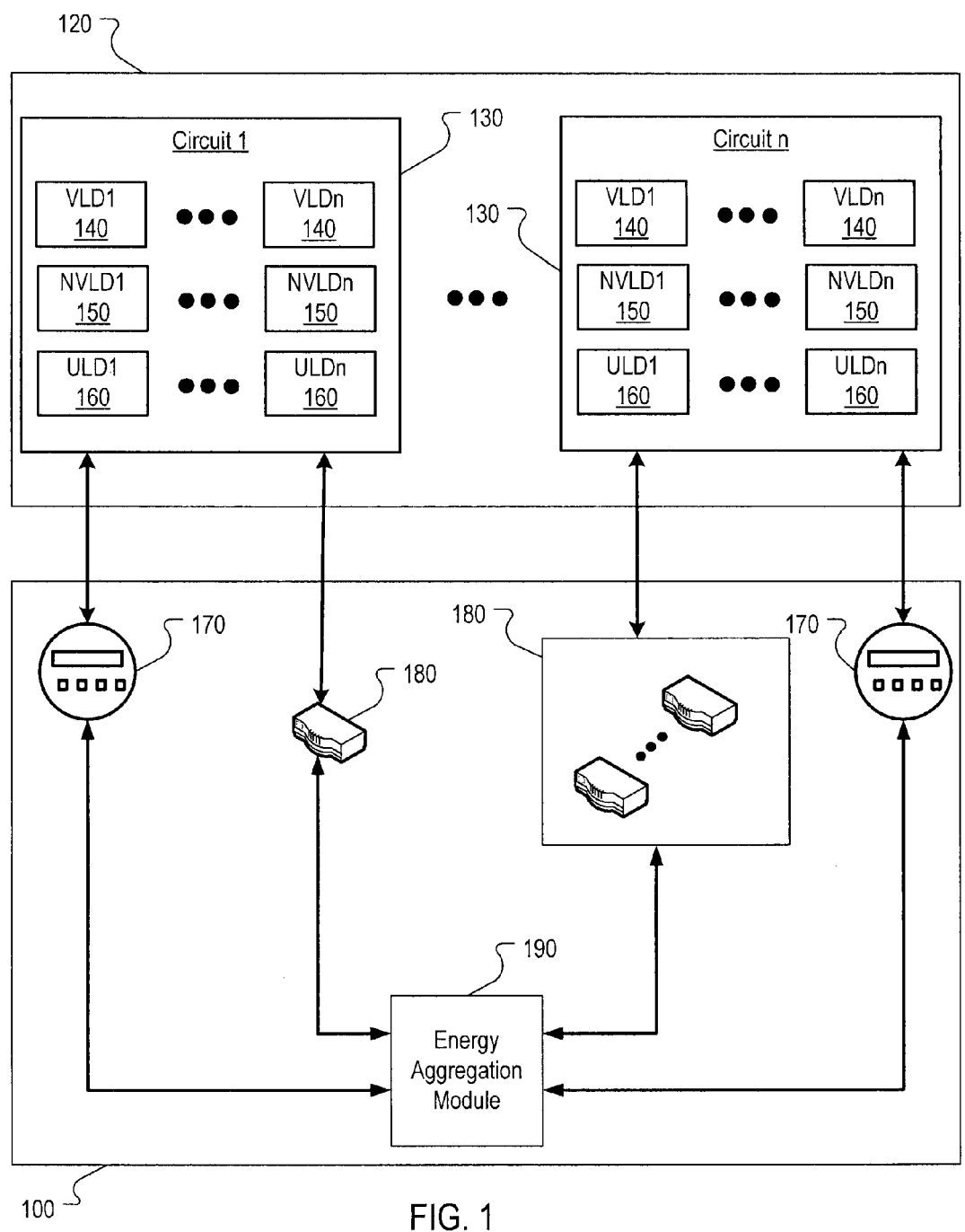
FIG. 1 is a block diagram of an example energy monitoring system monitoring an environment.

This written description describes methods, software and systems for determining and monitoring the energy consumption of electrical load devices (e.g., variable load devices having electrical loads that can selectively vary such as dimmable lights and non-variable load devices having electrical loads that are not selectively variable such as light sensors) in a commercial or residential environment (e.g., an office building or a house).

In particular, energy consumption profiles are generated for each of the variable load devices based on the known states of the variable load devices (e.g., 100% output, off, 30% output) and the energy consumed by the load devices at the various states as measured by a power meter (e.g., 0.1 mW during the off state, 30 W at 50% output and 68 W during 100% output). For example, the energy consumption profile for a variable load device can be generated by placing all of the other load devices in a known state (e.g., off) and sweeping the load device of interest across its various states while sampling the energy consumed by the load device (or a circuit to which the load device is connected) at each state as, for example, determined by a power meter associated with that load device (or the electrical circuit carrying that load device). For non-variable load devices, the energy consumption profiles can be constructed, for example, from manufacturer provided specifications (e.g., data sheets for the load device), or measured empirically by placing all the variable load devices in an off state.

These energy consumption profiles are then used to determine the amount of energy consumed by a system during operation. In particular, based on the energy consumption profiles and the load states of the load devices as determined and tracked by a control system, the amount of energy consumed during a given period for a load device, a group of load devices or the entire environment can be determined. For example, if the environment has two load devices with a first load device being set to a 50% output state and the second load device being set to a 100% output state by the control system during a one-hour time period of interest, and energy consumption profiles that specify 50% output by the first load device corresponds to a draw of 40 W and 100% output by the second load device corresponds to a draw of 31 W, then the energy consumed by the two load devices is 71 Watt-hours.

Advantageously, because all load devices are in a known state during the energy consumption profile generation process, power meters do not need to be placed at every load device to sample the energy (or power) consumed by that load device. Rather, the power meters can be placed at the circuit level where each circuit may have multiple load devices, and still effectively sample the energy consumed by one load device. For example, a circuit may have ten load devices. If all ten load devices are in a known state (e.g., off), then as one of the ten load devices is swept across its range of states (all other load devices being held in the known state, e.g., off), any change seen by the power meter for the circuit carrying that load device can be attributed to the load device. Thus, the energy consumption profile for each load device can be generated with the accuracy afforded by the power meter but without the cost and complexity of having to place a power meter at each load device.

In some implementations, the power meters can be added to the system during the energy consumption profile generation process, and then removed. Thus, the power meters may be re-used when setting up other energy monitoring systems, thereby reducing overall system and installation costs.

These implementations, and additional aspects, are described in more detail below.

2.0 Detailed System Operation

FIG. 1 is a block diagram of an example energy monitoring system 100 monitoring an environment 120. The energy monitoring system 100 is used to monitor the energy consumed by various electrical loads in the environment 120 such as, for example, a residential house, an apartment, an office building or a retail facility. More generally, an environment 120 is a collection of electrical circuits 130 (i.e., an electrical circuit being a closed path through which electric current can flow). For example, the environment 120 can include an electrical system with multiple electrical circuits 130 with each circuit 130 including one or more electrical load devices.

Some environments 120 can include different types of electrical load devices. For example, an environment can include variable load devices 140, non-variable load devices 150 and/or unidentified load devices 160. A variable load device 140 is a load device that consumes variable amounts of power at given times based on the operational state of the load device 140. The power consumed by variable load devices 140 can vary significantly and can be described by power consumption values or energy consumption values. As used herein, a variable load device is a load itself (e.g., a ballast), or the device that is used to control a load and the load itself (e.g., a wall switch or dimmer that controls a ballast), and for which an energy consumption profile is generated.

Generally, the variable load devices 140 have selectable load states (e.g., variable output or operational settings) and power consumption values (and accordingly energy consumption values) ranging from an OFF consumption value (e.g., when the device is turned off) to a maximum consumption value (e.g., when the device is at full output). For convenience, power consumption values and energy consumption values will be used interchangeably herein recognizing the relationship between energy and power.

In some implementations, the power consumption values of the variable load devices 140 are proportional to the selected load (operational) state of the variable load device 140. For example, a dimmable ballast for a lighting fixture may have three states: off, 100% output and 50% output that correspond to a power consumption values of 0.01 W, 60 W and 30 W, respectively. However, the consumptions values do not have to be (and often will not be) linearly proportional to the corresponding load state (e.g., the consumption values can be non-linearly proportional to the load states). Other examples of variable load devices include controllers, dimmable LED drivers, dimmable task lamps, variable frequency drives and power adapters.

A non-variable load device 150 is a load device that has power consumption values that do not significantly vary during its operation. Non-variable load devices have only one state (i.e., on) when part of an electrical circuit 130, and energy consumption values ranging from a first energy consumption value to a maximum energy consumption value. The variance in the energy consumption values is not caused by a load state change, as the devices 150 have only an on state. Rather, the variance can be caused, for example, by factors such as changes in the operating temperature of the device 150. Typically the variances are relatively small when compared to the variances of variable load devices. Non-variable load devices can include, for example, sensors (e.g., photo sensors), switches, dimmers and remotes that do not vary energy consumption loads. Both variable load devices 140 and non-variable load devices 150 communicate with the system 100 and, hence, are known to and identifiable by the system 100. Depending on the particular load device, the communications between the system 100 and variable load devices 140 and non-variable load devices 150 can be one-way or two-way communications.

Unidentified load devices 160 are load devices that are part of the environment 120 but, contrary to variable load devices 140 and non-variable load devices 150, are not identifiable by the system 100 without external input. Unidentified devices 160 are not in data communication with the system 100 but can be part of a circuit 130 in the environment 120 and consume energy. As such, the system 100 can detect the energy being consumed by the unidentified devices as the system 100 monitors the energy being consumed by the various load devices in the environment 120 (of which the unidentified load devices 160 can be a part) but cannot specifically attribute such consumption to a particular unidentified load device 160. Example unidentified load devices 160 include devices not under the control of the environment control system (e.g., a control system managing the operation of load devices in an environment) such as control devices (e.g., sensors and wireless adapters used by the control system), power meters (including system 170 if it draws power to detect the power consumed by the electrical circuit), HVAC devices not under control of load controller device 180, computer monitors plugged into power strips, mobile device chargers plugged into outlets, and the like.

Some environments 120 include other types of load devices that can be monitored by the system 100. Some environments 120 include, for example, peripheral load control devices and the like (e.g., wireless plug load controllers). Various load devices can be connected to a circuit 130 through peripheral load control devices (e.g., a computer monitor plugged into the wireless plug load controller). The peripheral load control devices can be identified by the system and monitored. The power drawn by the peripheral load control devices can significantly vary based on which or how many types of load devices are connected to it. For example, at a first time, a computer monitor and a cell phone charger are connected to and drawing power through the peripheral load control device and at a second time only the computer monitor is connected to and drawing power through the peripheral load control device. The power consumption value at the first time is 12 W and at the second time is 10 W. Although, for example, load controller devices 180 may be able to turn the peripheral load control devices on or off, they cannot control what it connected to the peripheral load control devices. Thus, not all variations in power consumed by peripheral load control devices (or other load devices such as washing machines, dryers and the like) can be controlled by the load controller devices 180 even though those variations in power consumed by such devices can be monitored by the system 100.

Some peripheral load control devices can have integrated power meters, which can be referred to as power metered load devices or PMLDs. System 100 can readily incorporate consumption data from PMLDs. Power consumption values for these PMLDs can be, for example, communicated to the system 100 via load controller devices 180 communicating with the PMLDs.

To monitor the energy consumed by the variable load devices 140, the non-variable load devices 150 and/or the unidentified load devices 160 in the environment 120, in some implementations, the system 100 can include energy consumption detection systems 170, load controller devices 180 and energy aggregation modules 190.

Figure 2:
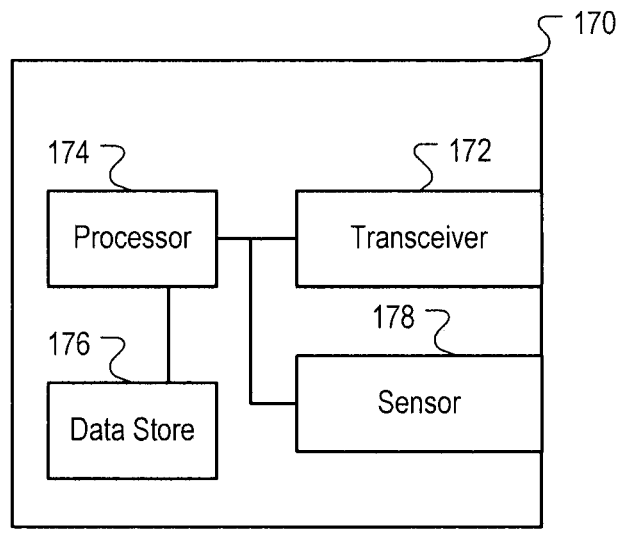
FIG. 2 is a block diagram of an example energy consumption detection system.

FIG. 2 is a block diagram of an example energy consumption detection system 170. In some implementations, each energy consumption detection system 170 detects (or can be used to determine) the power or energy being consumed by an electrical circuit, a group of electrical circuits, a load device or a group of load devices, depending on the location of the system 170 in the environment 120. For example, the system 170 can be placed in an electrical circuit 130 such that it detects the consumption from all load devices on the circuit 130 or it can be placed such that it detects only one load device or a group of load devices in the circuit 130. The energy consumption value is a measure of the energy consumed by a load device during a given time period. For example, the energy consumption value can be derived from instantaneous power readings (e.g., X Watts at a particular time) or sampled energy readings from a load device (e.g., Y Watt-hrs or Wh during a particular time period). An energy consumption detection system 170 can determine energy consumed by the circuit 130 it is monitoring during multiple different time periods each day.

In some implementations, the energy consumption detection system 170 can include a transceiver 172, a processor 174, a data store 176 and a sensor 178. The transceiver 172 is, for example, a radio coupled to the processor 174 and configured to transmit messages to and receive messages from the energy aggregation module 190 or the energy consumption detection system 180, such as data messages that specify energy consumption values from load devices (e.g., variable load devices 140 and non-variable load devices 150). In some implementations, the transceiver is capable of communicating wirelessly or via wired connections such as through serial or USB connections. The data store 176 is coupled to the processor 174 and stores instructions executable by processor 174. Additionally, the data store 176 can store other data, such as energy consumption value data. The sensor 178 is coupled to one or more electrical circuits 130 and detects energy consumption by the circuit(s) 130 or by one or more load devices in the circuit(s) 130 based on the positioning of the energy consumption detection system 170 and the configuration of the circuit(s) 130. In some implementations, the sensor 178 is a power meter (e.g., a current sensor and a voltage sensor). The system 170 can detect and report changes in the energy consumption values of the load devices, for example, as the load controller devices 180 vary the load states of the variable load devices 140.

Figure 3:
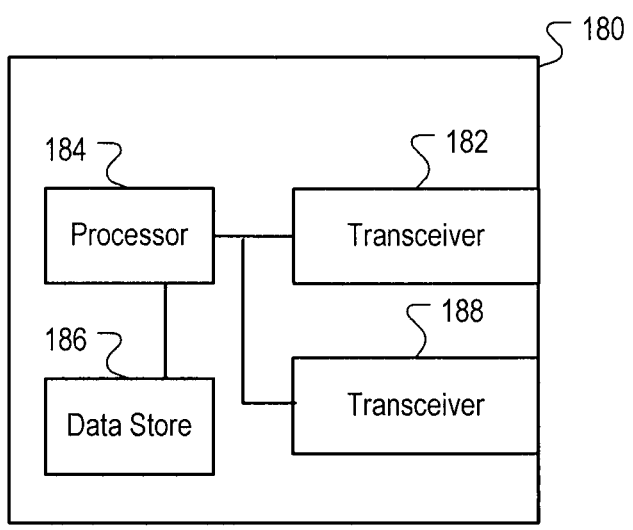
FIG. 3 is a block diagram of an example load controller device.

The load controller device 180 is described with reference to FIG. 3, which is a block diagram of an example load controller device 180. The load controller devices 180 are in data communication with the load devices. For example, one load controller device 180 may be in data communication with one load device, multiple load devices on the same circuit 130 or multiple load devices spread across multiple circuits 130. In some implementations, the load controller devices 180 can determine the type of load device (i.e., variable load device 140 or non-variable load device 150) to which the load controller device 180 is communicating. For example, the load controller device 180 can query the load device to elicit a response from the load device indicating certain load device parameters, such as the type of load device (e.g., ballast) or the manufacturing model or the part number of the load device.

In some implementations, the load control device 180 can include a first transceiver 182, a processor 184, a data store 186 and a second transceiver 188. The first transceiver 182 is, for example, coupled to the processor 184. In some implementations, the first transceiver 182 is capable of communicating over wired channels (e.g., serial or USB channels) and configured to transmit messages to (and in some implementation receive messages from) the energy aggregation module 190 (e.g., data messages indicating the load states of the variable load devices or data messages indicating the number and types of load devices under the load controller device's control). In some implementations, the first transceiver 182 (or another transceiver included in the load controller device 180) can also communicate with the energy consumption detection system 170. The second transceiver 188 is, for example, a radio coupled to the processor 184 and configured to communicate with load devices. For example, the load controller device 180 can send commands and queries to the load devices and receive responses from the load devices through the second transceiver. The data store 186 is coupled to the processor 184 and stores instructions executable by processor 184. In some implementations the data store 186 can store other data.

In some implementations, the load control device 180 can communicate with the variable load devices 140 to select selectable load states of the variable load devices 140. For example, the variable load device 140 may be a dimmable ballast with selectable load states (e.g., settings) ranging from an "off" load state (e.g., 0% output) to a full output load state (e.g., 100% output), and the load controller 180 may send an instruction to the dimmable ballast to set the ballast at the full output load state or select the 25% load state (e.g., the lights being energized by the ballast will be set at a 25% intensity level). The data store 186 can store selected load state data of the variable load devices specifying, for each variable load device 140, the load state of the device at a given time. For example, the load state data may specify that for a particular variable load device 140, that device was off from 9 PM Tuesday night to 6:59 AM Wednesday morning and was at a 75% load state (e.g., 75% output) from 7 AM Wednesday to 8:59 PM that night. In other implementations, the energy aggregation module 190 stores such load state data.

The energy aggregation module 190 is in data communication with the energy consumption detection system 170 and the load controller devices 180. The energy aggregation module 190 can be, for example, implemented in software, hardware or some combination thereof. The operation of the energy aggregation module 190 is described in more detail below.

The functionality described with reference to the energy consumption detection systems 170, the load controller devices 180 and the energy aggregation modules 190 can be implemented in any one or any combination of system 170, device 180 and module 190. For example, in some implementations, the functionality of the load controller devices 180 and energy aggregation modules 190 can be implemented in the same device.

2.1 Environment Energy Consumption Data

Figure 4:
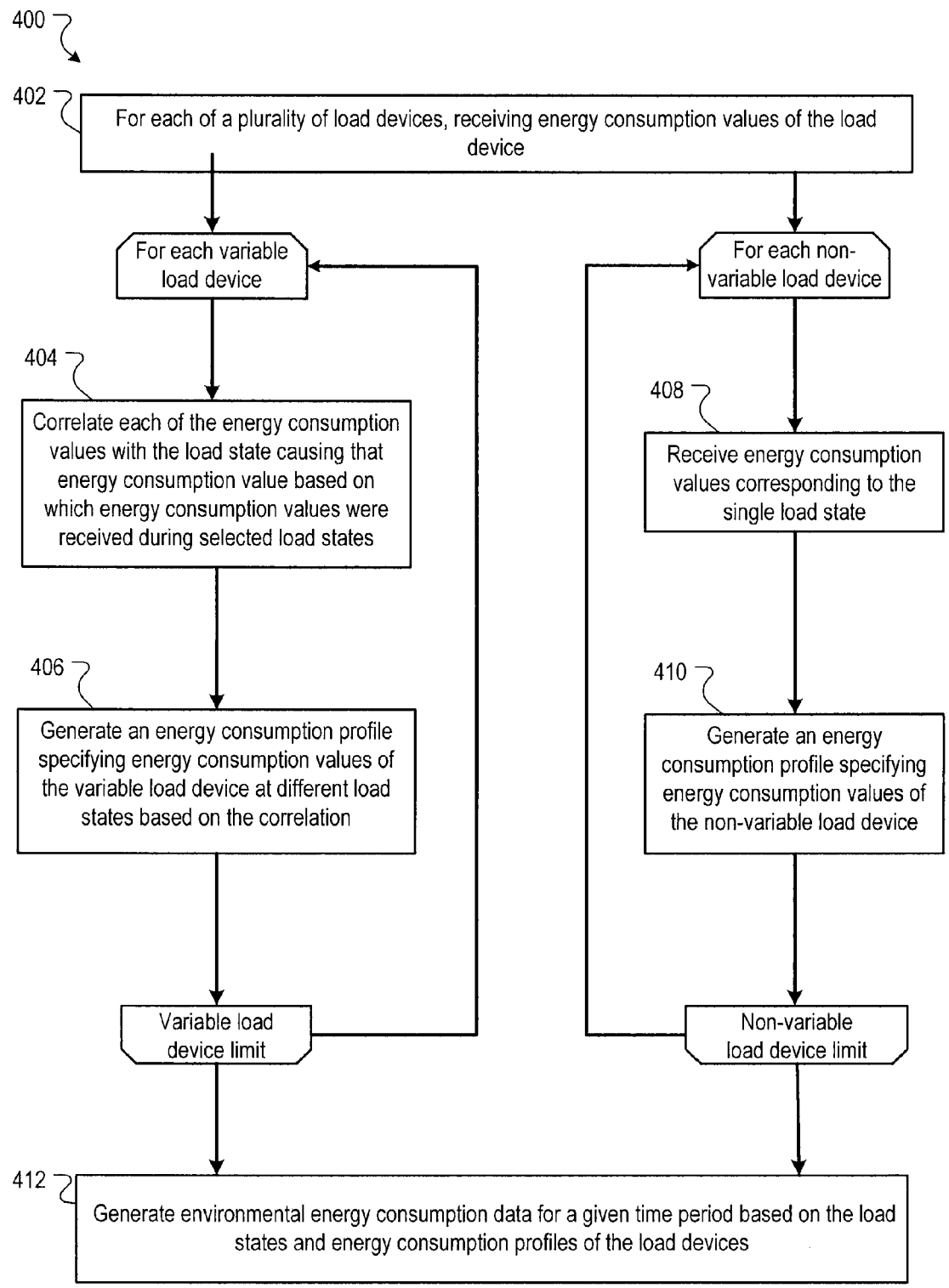
FIG. 4 is a flow diagram of an example process for generating environment energy consumption data.
Figure 5:
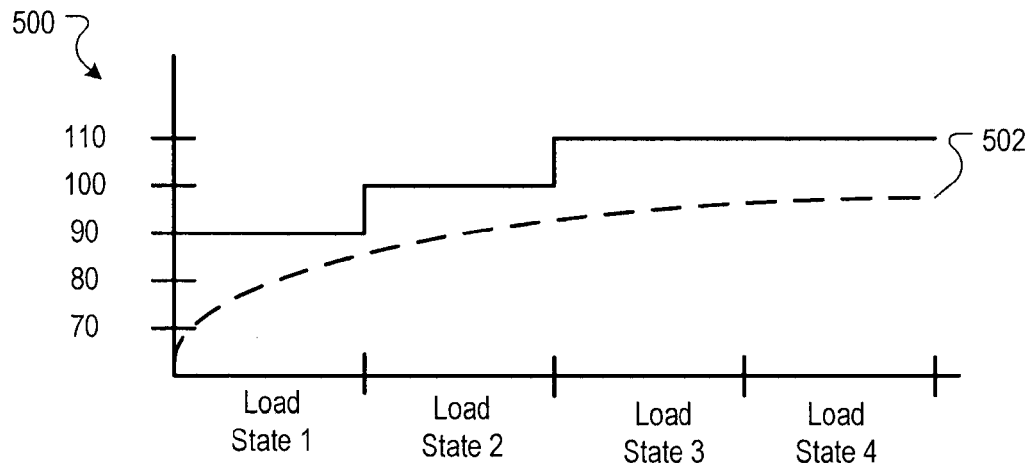
FIG. 5 is a chart illustrating an example energy consumption profile.

The operation of the energy aggregation module 190 for generating energy consumption profiles is described with reference to FIGS. 4 and 5. FIG. 4 is a flow diagram of an example process 400 for generating environment energy consumption data, and FIG. 5 is a chart illustrating an example energy consumption profile.

In some implementations, the energy aggregation module 190 (or more generally, the energy monitoring system 100) performs the process 400. The process 400, for each load device on a circuit, receives energy consumption values of the load device (402). Each energy consumption value is a measure of the energy consumed by the load device at a given time (e.g., an energy consumption rate). For example, the energy aggregation module 190 receives the energy consumption values of the variable load devices 140 and the non-variable load devices 150. In some implementations, given the relationship between power and energy noted above, the energy consumption value can be a measure of the power consumed by a load device at a given time, or during a given time period.

The process 400, for each of the variable load devices, correlates each of the energy consumption values with the load state causing that energy consumption value based on which energy consumption values were received during selected load states (404). In some implementations, the energy aggregation module 190 correlates each of the energy consumption values of a variable load device 140 with the load state of the device 140 causing that energy consumption value.

Two example modes by which the energy aggregation module 190 correlates the energy consumption values for variable load devices are an out-of-service mode and an in-service mode. The out-of-service mode occurs when the variable load devices 140 are not in use by environment occupants such as when an office building is closed at night, while the in-service mode occurs when variable load devices 140 are being used in normal course of operation.

During the out-of-service calibration process, the system 100 (e.g., as directed by the energy aggregation module 190) sets all variable load devices 140 under control to a known state, using, for example, the load controller devices 180. Then, sequentially, each load device 140, one at a time, is swept through its various load states and the energy consumption value for the load device 140 at each load state is determined. The out-of-service calibration is typically performed during the night (e.g., from 2:00 AM to 2:15 AM) or other times when the environment 120 is relatively inactive so as not to inconvenience or disturb any environment occupants by the load state sweeping process.

In some implementations, each load device 140 is swept through its load states multiple times during different time periods. For example, the load device 140 can be swept three times with each sweep being performed on a different night to determine if the sweep results from each night are within some tolerance range of each other. If the results are within some desired tolerance range (e.g., no more than 5% difference between the sweep results) then the sweep results can be determined to be reliable. If the sweep results are not within the tolerance range, then additional sweeps can be performed until a confidence threshold is reached that that the results from any sweeps not within the tolerance range are aberrant results that can be discarded (e.g., caused by an unidentified load device 160 being added to or removed from the environment 120 during the sweep). During the in-service calibration process, the energy aggregation module 190 generates data specifying the load states of all variable load devices 140 in the environment 120 at a particular time and the aggregate energy consumed by the environment 120 at that time to create load state/energy consumption snap shots of the environment 120. The snap shots are taken at numerous times. If two snap shots are identical, with respect to load device states, except for one load device 140 being in different load states, then the difference between the aggregate energy consumption values can be attributed to the load state change of the device 140. In some implementations, the in-service calibration process is used for environment 120 with few, if any, unidentified load devices 160 or in environments where the unidentified load devices account for only a small percentage of the overall environment energy consumption. The out-of-service and in-service calibration processes are described in more detail in Section 2.3 below.

In further implementations, the energy aggregation module 190 can employ an individual device variance method to correlate the energy consumption values with the load states causing those energy consumption values for the load devices 140. The individual device variance method can routinely monitor the load states of the variable load devices 140 and the aggregate energy consumed by the environment 120. When only one load device 140 changes state then any change in the environment's energy consumption during the time when the load device 140 changed its state (and during which time no other devices 140 changed state) can be attributed to that load device 140 changing state. For example, if it is determined that the environment's energy consumption at 3:20 PM is X and at 3:22 PM is Y and only one load device 140 varied its load state between 3:20 PM and 3:22 PM then the energy consumption difference between Y and X can be attributed to the load state change of the one load device 140.

More generally, by correlating the times during which the various load states of the load devices 140 occurred with the load device energy consumption values or the energy consumption values at those times, as the case may be, load state-energy consumption correlations can be determined. For example, a variable load device 140 may have a first energy consumption value (e.g., an energy sampling value) of 54 Wh at 2:02 AM and a second energy consumption value of 57 Wh at 2:03 AM (e.g., as determined by the energy consumption detection system 170 or as received from a control system for the relevant environment); and had a first load state at 2:02 AM and a second load state at 2:03 AM during an out-of-service calibration process. Thus, the following load state-energy consumption value correlations will be generated: the first load state correlates with the energy consumption value of 54 W as the first energy consumption value was measured during the first load state and the second load state correlates with the energy consumption value of 57 W as the second energy consumption value was measured during the second load state.

The process 400, for each of the variable load devices, generates an energy consumption profile specifying energy consumption values of the variable load device at different load states based on the correlation (406). In some implementations, the energy aggregation module 190 generates energy consumption profiles for each variable load device 140 in the environment 120 (i.e. variable load device limit). For example, the energy consumption profile for a variable load device 140 can be generated by combining the load state-energy consumption value correlations for that load device, as shown in exemplary profile 500 depicted in FIG. 5.

The energy consumption profile 500 is an energy consumption profile for a first variable load device 140. The energy consumption profile specifies that during the time of the first load state 1 the energy consumption value (e.g., sampled energy consumption value) was 90 Wh, during the during the time of the second load state the energy consumption value was 100 Wh, during the during the time of the third load state the energy consumption value was 110 Wh, and during the time of the fourth load state the energy consumption value remained at 110 Wh.

The profile 500 is an example for discrete states. If the variable load device has a continuous range of settings (e.g., from 0-100%), a corresponding curve for the profile may result. The dashed line 502 shows one example curve for a continuous range of settings.

For non-variable load devices 150, the process 400 can be done independently of variable load devices 140. The process 400, for each of non-variable load devices, receives energy consumption values corresponding to the single load state (408). In some implementations, the energy aggregation module 190 receives the energy consumption values. For example, the energy consumption profiles for the non-variable load devices 150 can be obtained from the respective manufacturers of the devices 150 or from a database that stores consumption information for each device type, model and manufacturer. In some implementations, the energy consumption profiles for non-variable devices 150 can also be generated by the empirical process described above with respect to variable load devices 140. However, the process is simplified given that each non-variable load device 150 only has one operational load state.

The process 400, for each of the non-variable load devices, generates an energy consumption profile specifying energy consumption values of the non-variable load device (410). In some implementations, the energy aggregation module 190 generates the energy consumption profile for each non-variable load device 150 in the environment 120 (i.e. non-variable load device limit). For some non-variable load devices 150, the energy consumption profile would be a horizontal line if graphed similarly to profile 500 as the non-variable load device only has one state. However, for some non-variable load devices the energy consumption values may slightly increase or decrease based on certain environmental or operational parameters such as operating temperature or duration of operating time. These fluctuations can also be captured in the profile and accounted for by the system 100.

The process 400 generates environment energy consumption data for a given time period based on the load states and energy consumption profiles of the plurality of load devices (412). The energy consumption data can specify the aggregate energy consumption of the plurality of load devices during a time period of interest and/or the granular energy consumption of individual load devices. In some implementations, the energy aggregation module 190 generates the environment energy consumption data. For example, during the time period from 8 AM to 9 AM, if a first load device is in a load state that correlates to a 70 Wh energy consumption value and a second load device is in a load state that correlates to a 60 Wh energy consumption value; and during the time period from 9:01 AM to 10 AM, the first load device is in a load state that correlates to a 50 Wh energy consumption value and the second load device is in a load state that correlates to a 120 Wh energy consumption value; then the environment energy consumption data specifies that the aggregate energy consumption of the first and second load devices during the time period from 8 AM to 10 AM is 300 Wh.

2.2 Energy Consumption Profile Generation

As described above with reference to FIG. 4, energy consumption profiles are generated based on load states and energy consumption profiles which, in turn, are based on energy consumption values. As described above, there are numerous methods for obtaining the energy consumption value for a load device at a particular load state (e.g., out-of service calibration and in-service calibration). One example out-of-service calibration process for determining energy consumption values for a load device at various load states (and generating energy consumption profiles) is described below with reference to FIG. 6.

Figure 6:
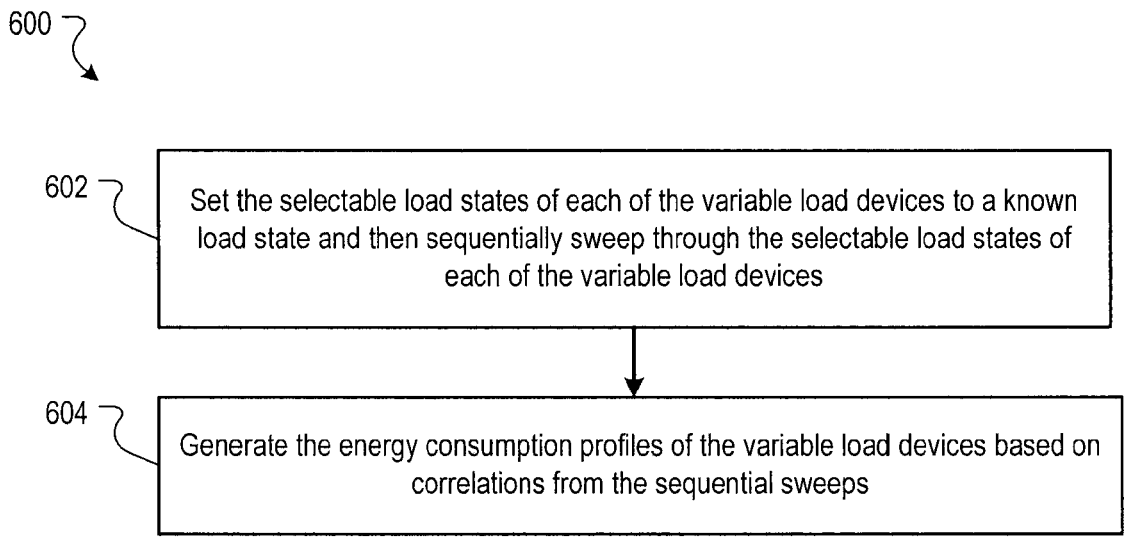
FIG. 6 is a flow diagram of an example process for generating energy consumption profiles for a variable load device.

With reference to FIG. 6, the process 600 sets the selectable load states of each of the variable load devices to a known load state and then sequentially sweeps through the selectable load states of each of the variable load devices (602). In some implementations, the load controller device 180 can set the selectable load states of each of the variable load devices 140 to a known load state (e.g., an "off" load state) and then sequentially sweep through the selectable load states of each of the variable load devices 140. For example, each of the variable load devices 140 can be set to the "off" load state (or any other constant load state) and then one-by-one each variable load device 140 can be swept through its range of load states. For each load state set during the sweep the energy consumption of the load device 140 can be sampled by, for example, the energy consumption detection system 170 (i.e., during the time period that a device is in a particular load state the energy consumption value can be sampled during that time period). By employing such a process the only change to the energy consumption of the environment can be attributed to the load state change of the device 140 being swept. In this manner the energy consumption value for each load state for each device 140 can be determined.

In addition, this process 600 permits the energy consumption detection system 170 detecting the energy consumed by a particular device to be identified and associated (e.g., by the energy aggregation module 190 in response to the sequential sweeps) with that load device, as only the energy consumption detection system 170 monitoring the load device being sweep will detect and report changes in energy consumption. As a result, the circuit on which the device resides on can be determined, and the circuit is the circuit that the energy consumption detection system 170 is attached to.

The process 600 generates the energy consumption profiles of the variable load devices based on correlations from the sequential sweeps (604). In some implementations, the energy aggregation module 190 generates the energy consumption profiles of the variable load devices 140 based on correlations from the sequential sweeps. As noted above, other methods such as the in-service calibration process can also be used to determine energy consumption values for a load device 140 at various load states, as described in more detail below.

In some implementations, the in-service calibration process can be used to determine energy consumption values for a load device at various load states without purposefully setting the load states of all the devices 140 to a particular state. Rather, at various times, snap shots can be taken of the aggregate energy consumption for the environment 120 (e.g., as determined by the energy consumption detection system 170) and of the load states for all of the devices (e.g., as determined by the load controller devices 180) such that each of the snap shots show the load state for each device and the aggregate energy consumption of the environment 120 at the time the snap shot was taken. For example, one snap shot may show that at a particular time device A was in a first load state and device B was in a sixth load state and the aggregate energy consumption of the environment 120 (consisting of only devices A and B) was the aggregation of the energy consumption values corresponding to the first load state of device A and the sixth load state of device B.

The various snap shots can be compared to one another. If two snap shots are identical other than the same device being in a different state (and the difference in aggregate energy consumption values), then the difference in the aggregate energy consumption values can be attributed to the change in state of that one device. By repeating this process with snap shots of permutations of every device load state for all devices, it is possible to extract the energy consumption profiles for all devices. In some implementations, the system 100 can take and compare the snap shots.

Some load devices 140 decrease in efficiency over time. For example, a fluorescent ballast gradually decreases its light output per Watt consumed, and if the control system of the environment 120 attempts to maintain the same light output to meet lighting design specifications, the energy consumption values of the ballast will increase over time. Therefore, in some scenarios, ongoing calibration and adjustment of the energy consumption profiles may be necessary to ensure the profiles accurately reflect the energy consumed by the load devices 140.

As described above, in some implementations, the energy consumption detection system 170 can receive and/or determine changes in the energy consumption values of the load devices, and can be, for example, a power meter. The type of power meter used can affect the accuracy of the energy consumption values and, hence, the profiles. For example, in the case of an out-of-service calibration process the circuit 130 may be lightly loaded (if all load devices but the load being swept is set to an "off" state). As such, the power meter should be selected to achieve the measurement granularity and accuracy desired (e.g., if the power meter is designed for high loads then the accuracy and granularity of the power meter for the lightly loaded circuit 130 may be less than desired).

2.3 Energy Consumption Attribution for Unidentified Load Devices

Regardless of the method used to generate the energy consumption profiles for the variable 140 and non-variable devices 150, the energy profiles of those devices can be utilized to attribute unaccounted for energy consumption to the unidentified load devices 160, as described in more detail below. One example process for attributing unaccounted energy consumption to the unidentified load devices 160 is described with reference to FIG. 7.

Figure 7:
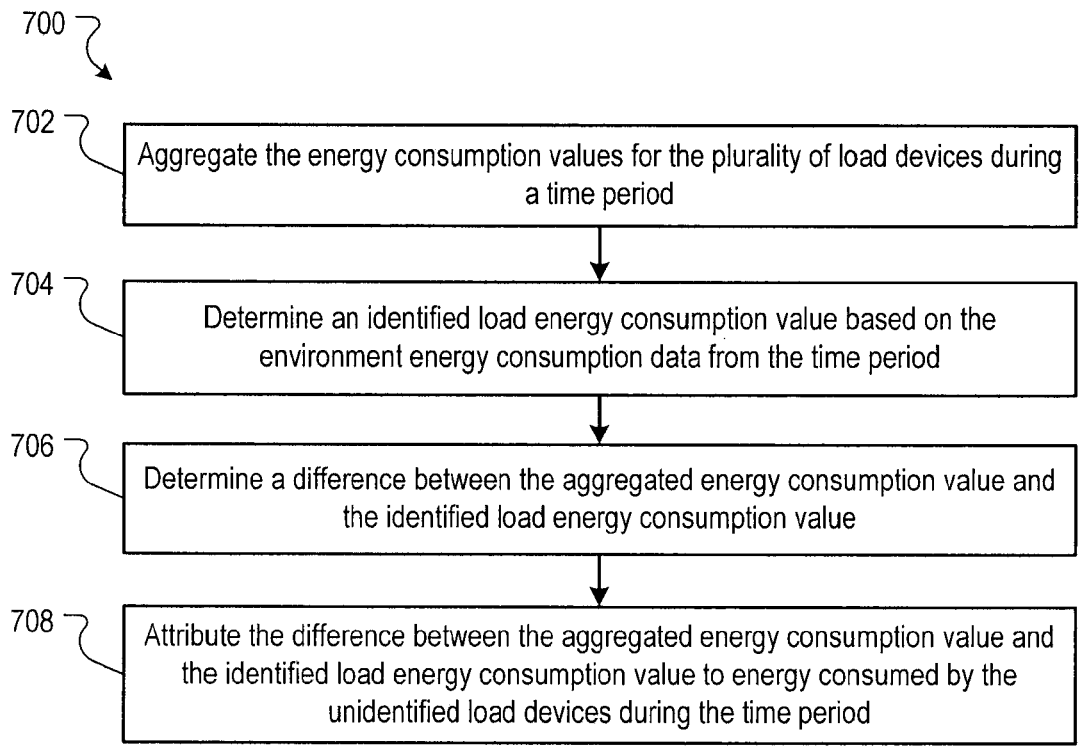
FIG. 7 is a flow diagram of an example process for attributing energy consumption to the unidentified devices.

FIG. 7 is a flow diagram of an example process 700 for attributing energy consumption to the unidentified load devices 160.

The process 700 aggregates the energy consumption values for the plurality of load devices during a time period, wherein the plurality of load devices comprise unidentified load devices (702). In some implementations, the energy aggregation module 190 aggregates the energy consumption values received by the energy consumption detection systems 170. For example, if there are two energy consumption detection systems 170, each having four power meters, then the readings from the eight power meters are aggregated. This aggregation of the energy consumption values is the energy consumption of the entire environment 120 including any variable load devices 140, any non-variable load devices 150 and any unidentified load devices 160.

The process 700 determines an identified load energy consumption value based on the environment energy consumption data from the time period (704). In some implementations, the energy aggregation module 190 determines an identified load energy consumption value. As the identified load energy consumption value is based on the environment energy consumption data, which is based on the energy profiles and load states of the variable 140 and non-variable load devices 150, the identified load energy consumption value does not include any energy consumed other than that consumed by the variable 140 and non-variable load devices 150. In other words, because only the variable 140 and non-variable load devices 150 have energy consumption profiles, no other energy consumption values are reflected in the environment energy consumption data.

The process 700 determines a difference between the aggregated energy consumption value and the identified load energy consumption value (706). In some implementations, the energy aggregation module determines a difference between the aggregated energy consumption value and the identified load energy consumption value. For example, the identified load energy consumption value can be subtracted from the aggregated energy consumption value to determine energy consumed by devices other than the variable 140 and non-variable load devices 150. If the environment 120 does not have any unidentified load devices 160 then the aggregated energy consumption value and the identified load energy consumption value will be the same or substantially the same (e.g., some slight difference is possible as the identified load energy consumption value is an inferred measure and the aggregated energy consumption value is an empirical measure). However, if the environment 120 includes unidentified load devices 160 then the aggregated energy consumption value and the identified load energy consumption value will not be the same and there will be a difference reflective of the energy consumed by the unidentified load devices 160.

The process 700 attributes the difference between the aggregated energy consumption value and the identified load energy consumption value to energy consumed by the unidentified load devices during the time period (708). In some implementations, the energy aggregation module 190 attributes the difference between the aggregated energy consumption value and the identified load energy consumption value to energy consumed by the unidentified load devices 160. For example, the aggregated energy consumption value for a certain time period may be 600 Wh and the identified load energy consumption value for that same time period may be 500 Wh. The difference (i.e., 100 Wh) during the relevant time period can be attributed to the unidentified load devices 160.

In some implementations, process 700 can be performed on a per energy consumption detection system 170 basis, as opposed to being performed on a system 100 level basis (in many scenarios a system 100 includes numerous energy consumption detection systems 170). For example, if system 100 includes six energy consumption detection systems 170, then process 700 can be performed on each of the six individual energy consumption detection systems 170 to identify energy consumed by unidentified load devices monitored by particular energy consumption detection systems 170 (or a circuit 130 or circuits 130 associated with the system 170). The energy consumption attributed to the unidentified load devices 160 associated with of each of the six energy consumption detection systems 170 can be aggregated to determine a system-wide (e.g., system 100 including the six energy consumption detection systems 170) consumption figure.

Other methods can also be used to determine the energy consumption of unidentified load devices 160. For example, during an out-of-service calibration process, all load devices under control (e.g., all variable load devices 140 and other controllable load devices such as PMLDs) can be set to an "off" load state so that they are consuming no significant energy. Any energy being consumed during periods during which these controllable devices are off, can be attributed to unidentified load devices 160. This method can be used, for example, to determine the energy consumed by unidentified load devices 160 in environments 120 comprised completely or mostly of controllable load devices that can be turned off and unidentified load devices 160 that have non-variable loads and are always or usually in an "on" state, and/or account for only a small percentage of the overall environment energy consumption figures (e.g., lighting system environments).

2.4 Alarm Data Generation

In some implementations, the energy monitoring system 100 can identify possible maintenance issues with the load devices based on the comparison of energy consumption values of load devices at particular load states. One example process for identifying potential maintenance issues with a load device is described with reference to FIG. 8.

Figure 8:
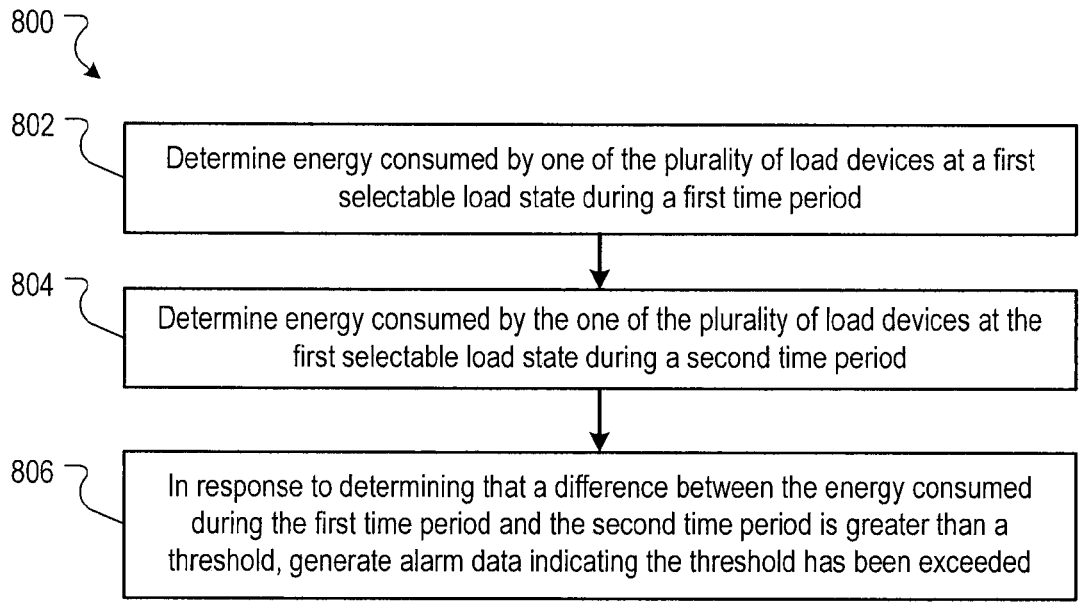
FIG. 8 is a flow diagram of an example process for generating alarm data for a load device.

FIG. 8 is a flow diagram of an example process 800 for generating alarm data for a load device.

The process 800 determines energy consumed by one of the plurality of load devices at a first selectable load state during a first time period (802). In some implementations, the energy aggregation module 190 determines energy consumed by one of the plurality of load devices at a first selectable load state during a first time period. For example, a first variable load device 140 operating at a first load state may have an energy consumption value (e.g., an energy consumption sample value) of 80 Wh at 8 PM on Tuesday. In some implementations this energy consumption determination is performed with all of load devices set to a known load state (e.g., an off load state) and the first variable device 140 set to the first load state (e.g., a load state other than the off load state).

The process 800 determines energy consumed by the one of the plurality of load devices at the first selectable load state during a second time period (804). In some implementations, the energy aggregation module 190 determines energy consumed by the one of the plurality of load devices at the first selectable load state during a second time period. For example, the first variable load device 140 operating at the first load state may have an energy consumption value of 70 Wh at 8 PM on Wednesday. In some implementations this energy consumption determination is performed with all of load devices set to a known load state (e.g., an off load state) and the first variable device 140 set to the first load state (e.g., a load state other than the off load state).

The process 800, in response to determining that a difference between the energy consumed during the first time period and the second time period is greater than a threshold, generates alarm data indicating the threshold has been exceeded (806). In some implementations, the energy aggregation module 190 generates alarm data. For example, if the first variable load device 140 operating at the first load state has different energy consumption values then likely the load device 140 is failing, has failed or is otherwise not performing as it previously did as indicated by the reduced energy consumption value measured on Wednesday night. For example, from 8-10 PM on Monday night, a dimmable ballast energizing four lamps set to a first load state had an energy consumption value of 200 Wh and from 8-10 PM on Tuesday night at the same load state the ballast had an energy consumption value of 180 Wh. This decrease in the energy consumption values for the ballast operating at the same load state could indicate one of the lamps has failed or some other malfunction has occurred. The alarm data could be provided to a technician to alert the technician to check that particular ballast or lamps attached to the ballast to determine if any of them had failed.

In some implementations, the process 800 determines the energy consumed by a load device at a first selectable load state during repeated first time periods. For example, the energy aggregation module 190 can determine the energy consumed by a load device at a first load state during a first time period (e.g., 8-10 PM) multiple times (e.g., 8-10 PM on Tuesday, Wednesday and Thursday) to determine the variance between the various first time period consumption values. Determining the energy consumed by the load device during multiple first time periods provides the range of energy consumption values likely to be seen during the first time period. If the variance of these values is within an acceptable range then it can be determined by the energy aggregation module 190 that the energy consumption values from the first time period are a reliable basis for comparison with values from the second time period (e.g., for generating the alarm data). If the variance is not within the acceptable range then more energy consumption readings can be performed to determine the range of values typically seen during the first time period or to further investigate the cause of any disparate readings.

The variance between the energy consumption values determined during various first time periods can also be used by the energy aggregation module 190 to set or adjust the threshold for generating the alarm data. For example, if the values from the first time period are within 1% of each other then the threshold might be set at a 10% difference between values from the first and second time periods. However, if the values from the first time period are within 9% of each other then the threshold might be set at a 20% to reduce the likelihood of a false alarm given the wide range of values from the first time period.

In some implementations, the energy monitoring system 100 is part of a control system for an environment 100 and in other implementations the system 100 cooperates with but is distinct from the control system.

3.0 Additional Implementations

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor or dedicated processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An energy monitoring system, comprising:
   energy consumption detection systems, each energy consumption system determines energy consumption values for a respective plurality of load devices, the energy consumption values being measures of the energy consumed by load devices during given time periods, wherein the plurality of load devices comprise:
      variable load devices, each of the variable load devices having selectable load states and energy consumption values ranging from an OFF energy consumption value to a maximum energy consumption value, wherein the energy consumption values are proportional to the selected load state of the variable load device; and
      non-variable load devices, each of the non-variable load devices having a single load state and energy consumption values ranging from a first energy consumption value to a maximum energy consumption value, wherein the energy consumption values correspond to the single load state of the non-variable load device; and
   load controller devices in data communication with the plurality of load devices, wherein each of the load controller devices communicate with the variable load devices to select the selectable load states of the variable load devices; and
   an energy aggregation module in data communication with the energy consumption detection systems and the load controller devices, wherein:
      for each of the variable load devices, the energy aggregation module:
         correlates each of the energy consumption values with the load state causing that energy consumption value based on which energy consumption values were received during selected load states; and
         generates an energy consumption profile specifying energy consumption values of the variable load device at different load states based on the correlation;
      for each of non-variable load devices, the energy aggregation module:
         receives energy consumption values corresponding to the single load state; and
         generates an energy consumption profile specifying energy consumption values of the non-variable load device; and
      the energy aggregation module generates environment energy consumption data for a given time period based on the load states and energy consumption profiles of the plurality of load devices.

2. The system of claim 1, wherein the plurality of load devices comprise unidentified load devices and the energy aggregation module:

aggregates the energy consumption values for the plurality of load devices during a time period;
determines an identified load energy consumption value based on the environment energy consumption data from the time period;
determines a difference between the aggregated energy consumption value and the identified load energy consumption value; and
attributes the difference between the aggregated energy consumption value and the identified load energy consumption value to energy consumed by the unidentified load devices during the time period.

3. The system of claim 1, wherein:
the load controller sets the selectable load states of each of the variable load devices to a known load state and then sequentially sweeps through the selectable load states of each of the variable load devices; and
the energy aggregation module generates the energy consumption profiles of the variable load devices based on correlations from the sequential sweeps.

4. The system of claim 3, wherein:
each of the variable load devices is connected to one of a plurality of electrical circuits and each electrical circuit is monitored by an energy consumption detection system; and
in response to the sequential sweeps, the energy aggregation module:
identifies the energy consumption detection system that determined the energy consumption values of a particular variable load device; and
associates the electrical circuit monitored by that energy consumption detection system with the variable load device being swept.

5. The system of claim 1, wherein the energy aggregation module receives energy consumption values corresponding to the single load state comprises receiving the energy consumption values from manufacturers of the non-variable load devices.

6. The system of claim 1, wherein the energy aggregation module determines the energy consumed by one of the plurality of load devices during a given time period based on data from the energy consumption profile of the one of the plurality of load devices during the given time period.

7. The system of claim 1, wherein the energy aggregation module:
determines energy consumed by one of the plurality of load devices at a first selectable load state during a first time period;
determines energy consumed by the one of the plurality of load devices at the first selectable load state during a second time period; and
in response to determining that a difference between the energy consumed during the first time period and the second time period is greater than a threshold, generates alarm data indicating the threshold has been exceeded.

8. The system of claim 7, wherein determines energy consumed by one of the plurality of load devices at a first selectable load state during a first time period comprises determining energy consumed by the one of the plurality of load devices at the first selectable load state during multiple first time periods.

9. The system of claim 1, wherein energy consumption detection system comprises power meters.

10. The system of claim 9, wherein the variable load devices comprises lighting fixtures.

11. The system of claim 10, wherein the data communication between the load controller devices and the variable load devices is wireless data communication.

12. The system of claim 1, wherein the data communication between the load controller devices and the variable load devices is wireless data communication.

13. A computer-implemented method, comprising:
for each of a plurality of load devices, receiving energy consumption values of the load device, wherein an energy consumption value is a measure of the energy consumed by the load device during a given time period, and wherein the plurality of load devices comprise:
variable load devices, each of the variable load devices having selectable load states and energy consumption values ranging from an OFF energy consumption value to a maximum energy consumption value, wherein the energy consumption values are proportional to the selected load state of the variable load device; and
non-variable load devices, each of the non-variable load devices having a single load state and energy consumption values ranging from a first energy consumption value to a maximum energy consumption value, wherein the energy consumption values correspond to the single load state of the non-variable load device; and
for each of the variable load devices:
correlating each of the energy consumption values with the load state causing that energy consumption value based on which energy consumption values were received during selected load states; and
generating an energy consumption profile specifying energy consumption values of the variable load device at different load states based on the correlation;
for each of non-variable load devices:
receiving energy consumption values corresponding to the single load state; and
generating an energy consumption profile specifying energy consumption values of the non-variable load device; and
generating environment energy consumption data for a given time period based on the load states and energy consumption profiles of the plurality of load devices.

14. The method of claim 13, wherein the plurality of load devices comprise unidentified load devices, the method further comprising:
aggregating the energy consumption values for the plurality of load devices during a time period;
determining an identified load energy consumption value based on the environment energy consumption data from the time period;
determining a difference between the aggregated energy consumption value and the identified load energy consumption value; and
attributing the difference between the aggregated energy consumption value and the identified load energy consumption value to energy consumed by the unidentified load devices during the time period.

15. The method of claim 13 further comprising:
setting the selectable load states of each of the variable load devices to a known load state;
sequentially sweeping through the selectable load states of each of the variable load devices; and
generating the energy consumption profiles of the variable load devices based on correlations from the sequential sweeps.

16. The method of claim 15, wherein each of the variable load devices is connected to one of a plurality of electrical circuits and each electrical circuit is monitored by an energy consumption detection system, the method further comprising:

in response to the sequential sweeps:
identifying the energy consumption detection system that determined the energy consumption values of a particular variable load device; and
associating the electrical circuit monitored by that energy consumption detection system with the variable load device being swept.

17. The method of claim 13, wherein receiving energy consumption values corresponding to the single load state comprises receiving the energy consumption values from manufacturers of the non-variable load devices.

18. The method of claim 13 further comprising:
determining energy consumed by one of the plurality of load devices at a first selectable load state during a first time period;
determining energy consumed by the one of the plurality of load devices at the first selectable load state during a second time period; and
in response to determining that a difference between the energy consumed during the first time period and the second time period is greater than a threshold, generating alarm data indicating the threshold has been exceeded.

19. The method of claim 18, wherein determining energy consumed by one of the plurality of load devices at a first selectable load state during a first time period comprises determining energy consumed by the one of the plurality of load devices at the first selectable load state during multiple first time periods.

20. A non-transitory computer storage medium encoded with a computer program, the program comprising instructions that when executed by data processing apparatus cause the data processing apparatus to perform operations, comprising: for each of a plurality of load devices, receiving energy consumption values of the load device, wherein an energy consumption value is a measure of the energy consumed by the load device during a given time period, and wherein the plurality of load devices comprise: variable load devices, each of the variable load devices having selectable load states and energy consumption values ranging from an OFF energy consumption value to a maximum energy consumption value, wherein the energy consumption values are proportional to the selected load state of the variable load device; and non-variable load devices, each of the non-variable load devices having a single load state and energy consumption values ranging from a first energy consumption value to a maximum energy consumption value, wherein the energy consumption values correspond to the single load state of the non-variable load device; and for each of the variable load devices: correlating each of the energy consumption values with the load state causing that energy consumption value based on which energy consumption values were received during selected load states; and generating an energy consumption profile specifying energy consumption values of the variable load device at different load states based on the correlation; for each of non-variable load devices: receiving energy consumption values corresponding to the single load state; and generating an energy consumption profile specifying energy consumption values of the non-variable load device; and generating environment energy consumption data for a given time period based on the load states and energy consumption profiles of the plurality of load devices.

* * * * *